3,041,353
PROCESS FOR PREPARING VINYLENE
CARBONATE
Morris Zief and Charles H. Schramm, Easton, Pa., assignors to J. T. Baker Chemical Company, Phillipsburg, N.J., a corporation of New Jersey
No Drawing. Filed Aug. 26, 1960, Ser. No. 52,027
5 Claims. (Cl. 260—340.2)

This invention relates to an improved process of preparing vinylene carbonate.

Vinylene carbonate and its preparation by dehydrohalogenation of monochloroethylene carbonate has been described by Newman et al., J. Am. Chem. Soc., 75, 1263 (1953) and also in United States Patent No. 2,918,478 issued December 22, 1959. Pure vinylene carbonate can be polymerized with suitable free-radical-producing catalysts to yield hard, clear, water white polymers which are characterized by an unusually high heat resistance. Since these new polymers can be cast into optical lenses and other articles where clarity, hardness and heat resistance are essential qualities, vinylene carbonate may become an important industrial raw material. It is desirable, therefore, that processes of preparing vinylene carbonate with a high degree of purity and in high yields be made available.

Our efforts to prepare vinylene carbonate using the method described by Newman has resulted in some highly variable results. When monochloroethylene carbonate of 96 percent purity was dehydrohalogenated by heating with triethylamine in dry ether as described by Newman, a crude product was obtained in yields of 50 percent or less which contained 2 to 4 percent of chlorine-containing impurities. Fractionation through a 75 plate column yielded 30 percent of a product containing 0.6 to 0.8 percent of chlorine. When this product was refractionated through a 75 plate column, the product still contained 0.07 percent of chlorine and the yield was only 15 percent of the starting material.

The chlorine-containing impurities found in vinylene carbonate prepared from ethyl ether as just described have a profoundly adverse effect upon the polymerization of vinylene carbonate. To illustrate this, a series of polymerizations which was run with vinylene carbonate containing varying percentages of chlorine may be referred to. These polymerizations were effected by heating the monomer at 60° C. in the presence of 1.0 percent benzoyl peroxide. The following results were obtained:

| Percent Chlorine in Monomer | Appearance After 88 Hrs. | Percent Yield of PPtd. Polymer | Int. Visc. of Polymer, DMF, 20° C. |
|---|---|---|---|
| 3.72 | Brown liquid | None | |
| 2.17 | Brown gel (soft) | None | |
| 1.23 | Brown solid | 29 | 0.12 |
| 0.81 | Rubbery solid | None | |
| 0.42 | Hard, clear solid | 51 | 0.22 |
| 0.17 | Very hard, clear solid | 68 | 0.33 |

As will be seen, relatively small amounts of chlorine impurities make it impossible to obtain useful polymeric material.

A study of the decomposition products found in the crude vinylene carbonate prepared in ethyl ether revealed a small amount of material distilling at 75°–100° C. at atmospheric pressure. Fractionation of this yielded a colorless oil distilling at 78°–79° C., $n_D^{20}=1.4826$; $d^{20}=1.4337$. The material analyzed: carbon, 30.40; hydrogen, 4.12; and chlorine, 44.53, which corresponds to the empirical formula, $C_2H_3ClO$. The colorless liquid gave off strongly acidic fumes upon exposure to air and is a strong lachrymator which irritates the mucous membranes violently. The liquid is insoluble in water but soluble in ethyl alcohol. Upon standing at room temperature, an upper layer separates out. The original liquid gives an immediate precipitate with one percent aqueous silver nitrate and a positive Tollen's test at room temperature. Concentrated sulfuric acid gives a red color; 10 percent sodium hydroxide solution gives a yellow color.

This data suggests the presence of an aldehyde which can come from rearrangement of chloroethylene oxide as follows:

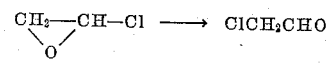

Apparently, chloroethylene oxide is formed during the dehydrohalogenation of chloroethylene carbonate as a side reaction according to the following:

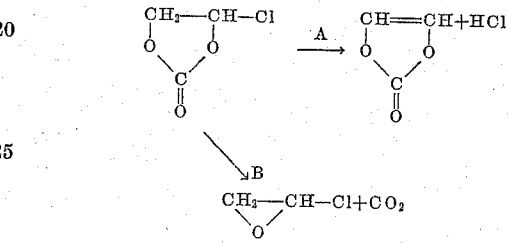

Reactions A and B are competitive in the presence of diethyl ether, and this accounts for the low yield and poor quality of the monochloroethylene carbonate when made by the process described by Newman.

It is known that some dichloroethylene carbonate is an impurity usually associated with monochloroethylene carbonate. In order to determine the effect of this material as an inhibitor of the polymerization, as well as to determine whether or not chloracetaldehyde, which we have demonstrated to be an impurity by the above reactions, adversely affects the polymerization, another series of polymerizations was run in which small amounts of these chlorine-containing impurities were added to pure monochloroethylene carbonate containing 0.03 percent chlorine. 6.5 grams of the monomer was polymerized at 60° C. for 84 hours with the following results:

| Impurity Added | Percent Benzoyl Peroxide | Percent Yield of PPtd. Polymer | Int. Visc. of Polymer, DMF, 20° C. |
|---|---|---|---|
| 1% Dichloroethylene Carb | 0.1 | 12.3 | 0.365 |
| 0.1% Dichloroethlene Carb | 0.1 | 58.5 | 0.78 |
| 1.0% Chloroacetaldehyde | 0.1 | 21.5 | 0.395 |
| 0.1% Chloroacetaldehyde | 0.1 | 63.1 | 0.56 |
| None | 0.1 | 75.4 | 0.84 |

As will be seen from the above results, both dichloroethylene carbonate and chloroacetaldehyde decrease the yield and intrinsic viscosity of the polymer drastically at one percent levels and have a significant adverse effect when present in amounts as low as one-tenth percent by weight.

To determine if the formation of undesirable by-products such as monochloroethylene oxide and monochloroacetaldehyde which takes place in the presence of diethyl ether could be avoided or minimized and better yields obtained, a search for a better solvent system was made. Some solvents gave susbtantially the same low yields, and some gave no yields at all. Surprisingly, however, we discovered that if the dehydrohalogenation is carried out in ethyl acetate, a far better yield of a product which can be easily purified is obtained.

For instance, when monochloroethylene carbonate of 96 percent purity was dehydrohalogenated in ethyl acetate, the crude vinylene carbonate contained 1.0 to 1.8 percent chlorine. Fractionation of the crude material through a 75 plate column resulted in a product containing 0.2 to 0.4 percent chlorine in a yield of 51 percent (based on the original crude material), and when refractionated the product contained only 0.02 percent chlorine and was obtained with a 33 percent yield (based on the original crude material). As will be seen, dehydrohalogenation in ethyl acetate gives a much higher yield of much purer product.

To illustrate in greater detail the use of ethyl acetate as the solvent medium for the dehydrohalogenation reaction and the advantages to be obtained thereby, the following example is given:

Example I

To 122.5 g. (one mole) of monochloroethylene carbonate ($n_D^{25}=1.4530$) in 400 ml. of ethyl acetate was added dropwise 101 g. of triethylamine (one mole) in 200 ml. of ethyl acetate. After stirring under reflux for 24 hours, the solids were removed and washed with ethyl acetate. The combined ethyl acetate filtrates yielded upon fractionation 34.0 g. of light yellow product distilling at 60°–63° C., (24 mm.); $n_D^{24}=1.4220$; yield 40 percent. Refractionation in a four foot by one inch packed column yielded a colorless liquid with $n_D^{25}=1.4195$ and containing 0.05 percent chlorine.

This material is readily polymerized with conventional free-radical-producing catalysts to yield homo-polymers of vinylene carbonate which have excellent physical properties. For example, a sample of the material polymerized in rod form yellowed at 242° C. but did not soften at 260° C. The rod did not sag at 250° F. when suspended in a cantilever arrangement. In another heat distortion test, a sample bar 5 x ½ x ¼ inch was tested at 264 p.s.i. loading by the ASTM method D 648. The result obtained was 119.5° C.

Example II

Monochloroethylene carbonate was dehydrochlorinated by slowly adding a solution of 85 g. (0.83 mole) of freshly distilled triethylamine in 35 ml. of anhydrous ethyl ether to a solution of 100 g. (0.81 mole) of monochloroethylene carbonate ($n_D^{25}=1.4530$) in 300 ml. of anhydrous ethyl ether contained in a 3-necked flask equipped with stirrer, addition funnel and reflux condenser. After refluxing for 24 hours, removing the precipitate and solvent, 12 g. of vinylene carbonate ($n_D^{25}=1.4235$) was obtained with a yield of 17.43 percent theory. This crude product contained between two and three percent of chlorine in the form of organically-bound chlorine impurities.

Example III

In an effort to improve the yield and quality of the product, the above procedure was repeated but the reflux period was increased to 80 hours. Although the yield of vinylene carbonate was increased to 21.9 g., or 31.5 percent of theory, the index of refraction was very high being $n_D^{25}=1.4398$ as compared with 1.4190 for the preferred product. This impure material was not usable without considerable purification and in this purification the over-all yield dropped to approximately 20 percent.

Example IV

When tetrahydrofuran was used as a solvent in place of ethyl ether as described in Example II; a crude product was obtained which, after fractionation to remove the solvent, yielded vinylene carbonate having an index of refraction $n_D^{25}=1.4240$ and a chlorine content of 2.88 percent. The yield was 28 percent of theory. This material was considered unsatisfactory for use without further purification.

Example V

When dioxane was used in place of ethyl ether in the dehydrochlorination of monochloroethylene carbonate as described in Example II, no vinylene carbonate was obtained after fractionation of the product to remove the solvent.

A number of other organic solvents were used in similar experiments but the resulting products were obtained in low yield and in poor quality when compared with the results obtained when using ethyl acetate as the solvent. For instance, when using acetone in place of ethyl either as in Example II, a 33 percent yield of vinylene carbonate containing 3.1 percent of chlorine was obtained. When using the dimethyl ether of ethylene glycol as a solvent, a yield of 32 percent of vinylene carbonate containing 2.8 percent of chlorine was obtained. Obviously, when these products are purified sufficiently for use, the yield based on the original starting material is so low as to make the use of these solvents impractical.

Although the preferred dehydrohalogenating agent is triethylamine, other tertiary amines of higher molecular weight which do not form stable quaternary salts with monochloroethylene carbonate, such as tributylamine, tripropylamine, triisopropylamine, diethylisopropylamine, diethylcyclohexylamine and other alkyl and cyclo-alkyl tertiary amines may be used.

Temperatures within the range 20°–90° C. may be used, but it is most convenient to carry out the dehydrohalogenation at the reflux temperature of the solution of monochloroethylene carbonate and the tertiary amine. The heating period may range from three to twenty-four hours but generally the dehydrohalogenation is completed in about sixteen hours at the refluxing temperature of the solution. Concentration of the monochloroethylene carbonate is not critical and may vary from about 10 to 50 percent by weight with about 25 percent being the preferred concentration.

We claim:

1. A method of preparing vinylene carbonate which comprises dehydrohalogenating monochloroethylene carbonate in ethyl acetate.

2. A method of preparing vinylene carbonate which comprises heating monochloroethylene carbonate dissolved in ethyl acetate in the presence of a tertiary amine.

3. A method of preparing vinylene carbonate which comprises heating monochloroethylene carbonate dissolved in ethyl acetate in the presence of triethylamine.

4. A method of preparing vinylene carbonate which comprises heating monochloroethylene carbonate with a molecular equivalent of triethylamine in ethyl acetate until the said monochloroethylene carbonate has been substantially dehydrohalogenated.

5. A method of preparing vinylene carbonate which comprises the steps of slowly adding triethylamine to a solution of monochloroethylene carbonate in ethyl acetate and heating the mixture at a temperature within the range 20°–90° C. until the monochloroethylene carbonate has been substantially completely dehydrochlorinated.

References Cited in the file of this patent
UNITED STATES PATENTS 2,918,478    Newman _____ Dec. 22, 1959